UNITED STATES PATENT OFFICE.

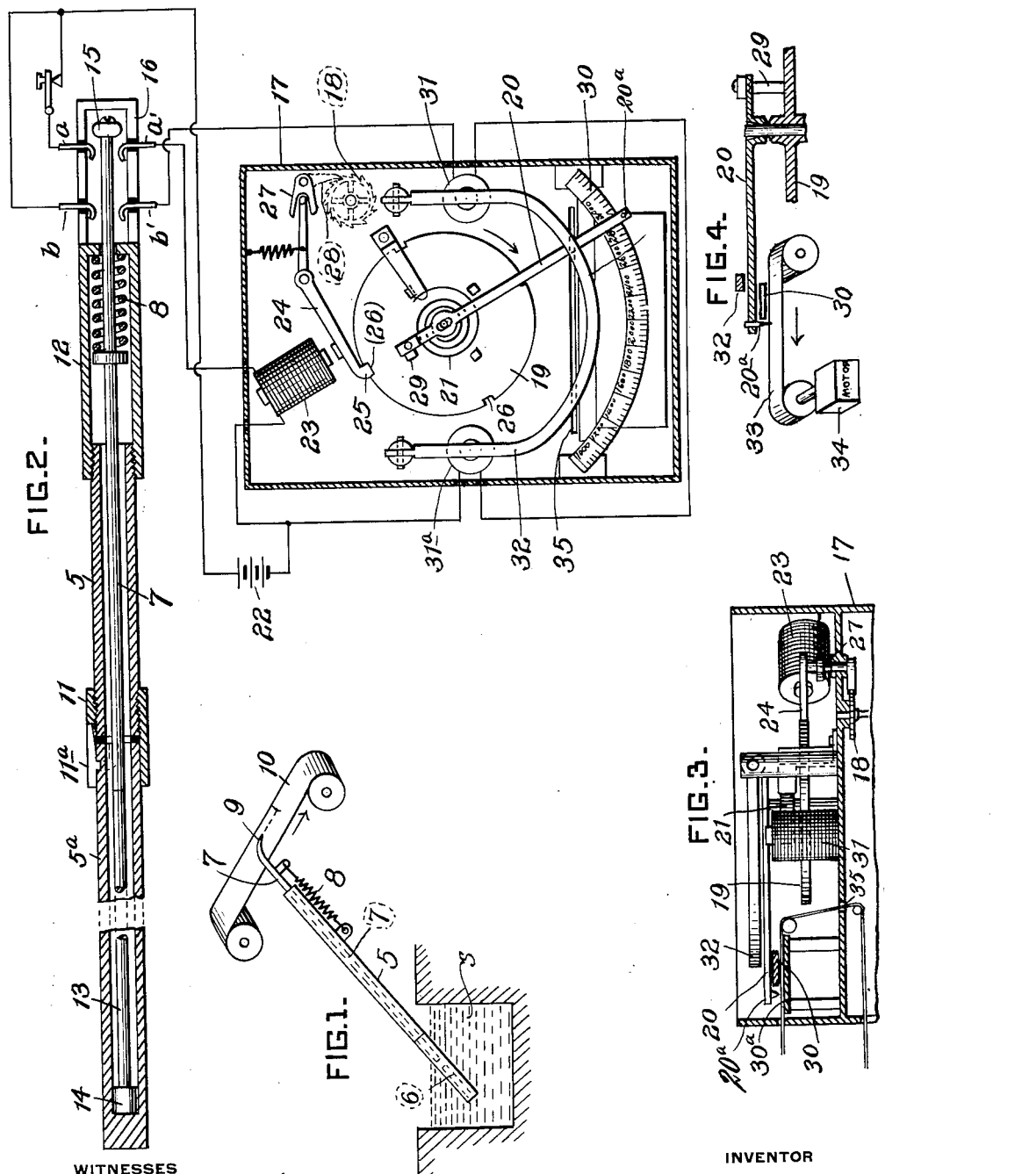

THEODORE W. CLARK, OF PITTSBURGH, PENNSYLVANIA, ASSIGNOR TO GIBB INSTRUMENT COMPANY, OF PITTSBURGH, PENNSYLVANIA, A CORPORATION OF PENNSYLVANIA.

PYROMETER METHOD AND APPARATUS.

1,147,483.  Specification of Letters Patent.  Patented July 20, 1915.

Application filed July 31, 1914. Serial No. 854,254.

*To all whom it may concern:*

Be it known that I, THEODORE W. CLARK, a citizen of the United States, residing at Pittsburgh, in the State of Pennsylvania, have invented a certain new and useful Pyrometer Method and Apparatus, of which the following is a specification.

My invention relates to the art of measuring temperatures, and is especially designed for the measurement of very high temperatures with accuracy, speed and economy.

Among other objects is the uniform and exact measurement of the temperature of such materials as large masses of molten steel or the like; the provision of automatic recording of the result, and the provision of simple and comparatively cheap apparatus for the purpose.

I have illustrated the invention in the accompanying drawing, as applied to the measurement of the temperatures of steel baths, though the invention is of course not limited to this nor to any particular means of recording or particular apparatus in any respect.

Figure 1 is a perspective diagram illustrating the method; Fig. 2 is a longitudinal section of a convenient form of pyrometer tube, with an electric diagram and a plan view of an electric indicating device. Fig. 3 is a side elevation of the electric indicator shown in plan in Fig. 2, and Fig. 4 is a perspective diagram showing a method of continually recording the indication of said electric indicator.

Heretofore the measurement of high temperatures has been accomplished by means of the expansions of solid bodies, or of gases and the measurement of the resulting physical movements or pressures.

My method, generally stated, involves the measurement of the time required by the object whose temperature is being measured to impart to another object a fixed amount of heat. For example, if it were desired to accurately measure the temperature of a molten steel bath, I proceed as illustrated in the drawing, referring first to Fig. 1, and supposing the proofs to represent a large body of metal. If the tube 5 contains a fusible rod 6 which required definitely known amount of heat to melt it, and upon which rests another rod 7, normally pushed downward by a spring 8 and at its outer end carrying a marker 9 under which there is a tape 10 traveling at a known rate, it will be evident that when the inner rod 6 has absorbed enough heat from the steel bath S to melt it, the outer rod 7 will be allowed to be dropped farther into the tube 5 and thus indicate accurately the moment when the melting took place. It is only necessary therefore to carefully record the time of beginning and time of ending of the process of melting the inner rod 6 which must be of known heat capacity or its support for this same purpose. It will be understood of course that the rod 6 may be in contact with any object of vastly greater mass whose temperature it is desired to measure, and that it may be made of any material appropriate to the temperature with which we are working.

Referring now to Figs. 2 and 3, I provide an operating tube 5 having at one end a sleeve 11 and at the other end a sleeve 12 as shown. Sleeve 11 is provided with a spring catch 11ᵃ making a bayonet joint with an extension 5ᵃ of the tube 5, the lower end of which is preferably thicker than the walls and which is made of a material which will melt in the medium whose temperature is to be determined, as for instance cold drawn soft seel.

Within the tube 5, I provide a plunger rod 7 normally pressed downward toward the far end of the instrument by a spring 8 and resting upon another rod 13. This rod in turn may rest on a small block of tin 14.

Tube extension 5ᵃ will of course be destroyed with each observation and should be made in uniform material and dimensions accurately determined as to mass.

The upper end of the plunger rod 7 carries a contact button 15 and on the upper end of tube 12 in a frame 16 I provide a series of electric contacts $a$, $a'$, $b$, $b'$. This is for operating an electric indicator, as here shown.

The essentials of the electric indicator are a clockwork in the box 17, including an escapement wheel 18, and on top of the box a rotating disk 19 carrying a pointer 20 held to zero position by spiral spring 21. and an arrangement of electromagnets for starting and stopping the movement of the pointer 20 in turn controlled by the movements of the pyrometer plunger 7. That is, when after plunging the hot end of the instrument in the steel bath, the block of tin 14 is melted, the plunger rod 7 will drop far enough for button 15 to make the contact a, a', thus connecting the battery 22 in circuit with the electromagnet 23 and raising the bell crank lever 24, lifting the dog 25 out of the slot 26 in the disk 19. The rear end of lever 24, at the same time turns the dog 27 on its pivot and by lifting the trip 28 releases the balance wheel or escapement wheel 18 or other delicate part of the clockwork in the box 17. The disk 19 therefore begins to slowly revolve by the clockwork as shown by the arrow, and a pin 29 on the disk engaging the rear end of the pointer 20, carries it with the disk so that its outer end travels over the scale 30, beginning at a known point.

When the fusible extension tube 5ª or the rod extension 13 has absorbed enough heat to melt of course the structure will collapse allowing the plunger rod 7 to be pushed farther in by influence of the spring 8. The button 15 will thereupon make the contact b, b', thus throwing into the circuit of the battery 22 the electromagnets 31, 31ª. Above their cores is placed a pivoted armature 32 in position just above the pointer 20, and its downward movement will clamp the pointer 20 down on the scale 30 at exactly the instant when the fusible element has melted. This movement of the arm 20 also lifts its rear end off the pin 29 on the disk 19, so that the disk may continue its movement without disturbing the pointer 20. The dog 25 on the lever 24 however will of course drop into the next slot 26 and reengage the trip 28 with the wheel 18 and and stop the clockwork.

As indicated in Fig. 4, I may use a traveling tape 33 drawn approximately at right angles to the movement of stilus 20ª on extended pointer arm 20 at regulated rate by clockwork or motor 34 and passing through the slot 35 (Fig. 2) and under scale 30 and stylus 20ª on the indicator arm 20 to make a continuous written record of the movements of the indicator arm. The tape 33 may be supported on a table 30ª directly under the scale 30, as shown in Fig. 3.

If the mass and rate of heat absorption of the tube extension 5ª and the extension rod 13 be known it is obvious that the time required to melt either of them by immersion in the steel will give an accurate measure of the temperature of the steel; and the scale 30 on the indicator is graduated accordingly, in terms of temperature. There is thus a direct reading of temperature, the ultimate position of the pointer 20 showing the temperature of an object to which the pyrometer is being applied. Every measurement will be under exactly the same conditions and there will result a uniformity and reliability of temperature measurements not heretofore obtained. There is of course no limit to the intensity of heat which may be measured, and the measurement being automatic is not liable to any error of observation.

Other advantages of the method and of the specific apparatus here disclosed for practising it will be apparent to those skilled in the art.

In the practice of my method as above described, I have used with success the "fire-ends" 5ª as shown in Fig. 2 in the form of tubes made of 0.12 per cent. carbon basic open hearth steel, 6" in length; and of diameter 1-1/4" outside and 3/8" inside, weighing 929 grams. These have a total heat content at fusion of 300 calories per kilogram, according to Richard's metallurgical calculations. These "fire-ends" are plunged into the molten steel to a depth of about ten inches, and at temperatures between 2500 and 3000 degrees F. they will absorb the 300 calories in about 30 seconds. They should be inserted quickly, or else devices should be used to prevent adherence of slag in any quantity thick enough to interfere with the measurement. The plug 14 ordinarily used is made of tin. Its size or mass should be uniform as it is a mere device to accurately mark the time of starting the recorder. I have measured such high temperatures repeatedly with a probable error of less than 10 degrees. In the marking of the scale 30 it is sufficient to assume that temperature will vary with the tangent of the time angle made by movement of the pointer 20.

Having thus described my invention and its use, what I claim is the following:

1. The method of determining the temperature of a highly heated fluid which consists in maintaining in heat conducting relation thereto until melted a test body of relatively negligible mass, noting the time required for such melting and comparing this time interval with those previously ascertained for the fusion, by subjection to heated fluids at various known temperatures, of test bodies identical in all respects with the one first named.

2. The method of determining the temperature of a highly heated fluid which consists in maintaining in heat conducting relation thereto until melted a pair of test bodies each of relatively negligible mass, but one less fusible than the other, noting the difference between the times of fusion and comparing this time interval with the previously ascertained corresponding intervals between the fusions, by subjection to heated fluids at various known temperatures, of test bodies in pairs, each pair being identical in all respects with the pair first named.

3. A pyrometer comprising a body adapted to be fused by submergence in molten metal, a movable part supported upon said body, and an indicating device comprising a pointer, a scale over which the pointer is movable, means for moving the pointer at a uniform rate, and means whereby movement of the pointer is governed by the movement of said movable part upon collapse of said body.

4. A pyrometer comprising a body adapted to be fused by submergence in molten metal, a movable part supported upon said body, and an indicating device comprising a pointer, a scale over which the pointer is movable and reading in terms of temperature, means for moving the pointer at a uniform rate, and means whereby movement of the pointer is stopped by the movement of said movable part upon collapse of said body.

5. A pyrometer for extremely high temperatures, comprising two elements of different fusibility, one supported on the other and both adapted to be immersed and melted in a bath of molten metal, a movable part temporarily supported by said elements, and a recording mechanism including a recorder, and means for impelling the same at a uniform speed, means to start said impelling means by the movement of said part due to the melting of one element, and means to stop the pointer upon similar movement due to the melting of the other element.

6. A pyrometer adapted for measuring the interior temperature of a molten steel bath comprising a fusible tube closed at the lower end and adapted to be submerged in the bath, a body of lower melting point than the tube and supported in the bottom of the latter, a non-melting rod resting on the body, a recording machine having a recorder, and means operated to start the same by the movement of said rod when the interior body melts and to continue the movement uniformly, and means whereby said recorder is stopped by further movement of said rod when said tube melts.

In testimony whereof I have hereunto signed my name in the presence of the two subscribed witnesses.

THEODORE W. CLARK.

Witnesses:
W. A. HECKMAN,
FREDK. STAUB.

---

It is hereby certified that in Letters Patent No. 1,147,483, granted July 20, 1915, upon the application of Theodore W. Clark, of Pittsburgh, Pennsylvania, for an improvement in "Pyrometer Methods and Apparatus," an error appears in the printed specification requiring correction as follows: Page 1, line 49, for the word "proofs" read *pool S;* and that the said Letters Patent should be read with this correction therein that the same may conform to the record of the case in the Patent Office.

Signed and sealed this 10th day of August, A. D., 1915.

[SEAL.]

R. F. WHITEHEAD

*Acting Commissioner of Patents.*